United States Patent [19]

Batick, Jr.

[11] Patent Number: 4,559,735

[45] Date of Patent: Dec. 24, 1985

[54] FISHING ROD AND REEL HOLDER FOR HANDICAPPED PERSONS

[76] Inventor: Philip Batick, Jr., 412 Hickory Hill Rd., Thomaston, Conn. 06787

[21] Appl. No.: 689,763

[22] Filed: Jan. 8, 1985

[51] Int. Cl.⁴ ............................................. A01K 97/10
[52] U.S. Cl. ........................................ 43/21.2; 43/25
[58] Field of Search ................ 43/21.2, 25, 18.1, 18.5

[56] References Cited

U.S. PATENT DOCUMENTS

| | | | |
|---|---|---|---|
| 2,146,350 | 2/1939 | Roberts | 43/25 |
| 2,158,104 | 5/1939 | Bowen | 43/25 |
| 3,367,056 | 2/1968 | Johnson | 43/25 |
| 3,372,510 | 3/1968 | Arsenault | 43/21.2 |
| 4,190,977 | 3/1980 | Casper | 43/25 |

FOREIGN PATENT DOCUMENTS

| | | | |
|---|---|---|---|
| 1553055 | 12/1968 | France | 43/21.2 |
| 76424 | 3/1950 | Norway | 43/25 |

*Primary Examiner*—Gene P. Crosby
*Attorney, Agent, or Firm*—Wood, Dalton, Phillips, Mason & Rowe

[57] ABSTRACT

A holding apparatus for attachment to the handle of a fishing rod and reel combination, with the apparatus being juxtaposed with respect to the reel. The holding apparatus has a pair of spaced apart side walls and a pair of spaced apart end rods extending transverse to the side walls with one end of each rod being secured to one side wall and passing freely through the other side wall. A clamp is rigidly secured to each rod outboard of said other side wall and is adjustably tightened against the handle of the rod. Compression springs extend between the side walls for holding the side walls apart. Resilient pads are mounted on the facing surfaces of the spaced side walls with an exposed edge of one pad abutting the exposed edge of the other pad to define a parting line slot therebetween. Adjusting screws extend between the side walls for adjusting the distance between the side walls for preloading the spring means and the pads with a predetermined compressive load. A fisherperson inserts a hand in the slot whereupon the rod and reel combination can be supported by the holding apparatus resiliently gripping the hand of the fisherperson.

8 Claims, 2 Drawing Figures

FISHING ROD AND REEL HOLDER FOR HANDICAPPED PERSONS

TECHNICAL FIELD

This invention relates to the sport of fishing and more particularly to an apparatus mounted on a fishing rod in the vicinity of the fishing reel to facilitate holding and manipulating the rod and reel by a handicapped person.

BACKGROUND ART

Fishing has been and continues to be a very popular great American sport and is participated in at all levels from the rank amateur to the skilled professional; by all age groups from the very youngest to the very oldest; and by all economic brackets from the very poor to the very wealthy. However, generally denied this pleasure has been the handicapped and, in particular, those suffering from crippling illnesses or accidents, such as paraplegics and, in particular, those suffering nerve and muscle disorders that affect the hands and the arms. The reason being that it is impossible to hold the rod and to manipulate the elements of the reel, even though such manipulation is relatively simple and requires in some cases relatively minimal skills and manual dexterity.

To participate in fishing, a relatively modest investment is all that is needed to be made to buy a rod and a reel with the appropriate tackle and bait. From this modest investment, many hours of pleasure, relaxation and challenge can be obtained by an individual without the need for skilled coaching and assistance from others. Handicapped people especially enjoy fishing, but those who suffer from crippling nervous disorders of the arms and hands are denied the pleasure and challenge because of the inability to hold the rod and to control the reel. The present invention is intended to overcome this problem and to make available to these people the pleasure and challenge of fishing.

DISCLOSURE OF THE INVENTION

This invention relates to a holding apparatus which can be attached to a fishing rod in generally juxtaposed relationship with respect to a fishing reel such that a person can insert a hand through resilient portions of the apparatus to effect a holding action for the rod. The positioning of the hand in the apparatus aligns the thumb of the hand with manipulative portions of the reel, such as the brake button on the rear of a spin cast type reel. A person with a muscular disorder in the arm and hand is able to insert his hand between the resilient portions of the apparatus so as to hold the rod with or without wrapping the hand around the rod, thereby making it possible to control the rod with the one hand while the other hand is used to crank the handle for retrieving the line, the bait and any fish that may have been caught. The apparatus makes it possible for the user to cast a bait manipulating the brake button during the cast. In this way it is possible to hold the fishing rod and reel, cast the bait using the rod and reel and retrieve the bait, even with severely handicapped hands and arms.

BEST MODE FOR CARRYING OUT INVENTION

Figure 1:
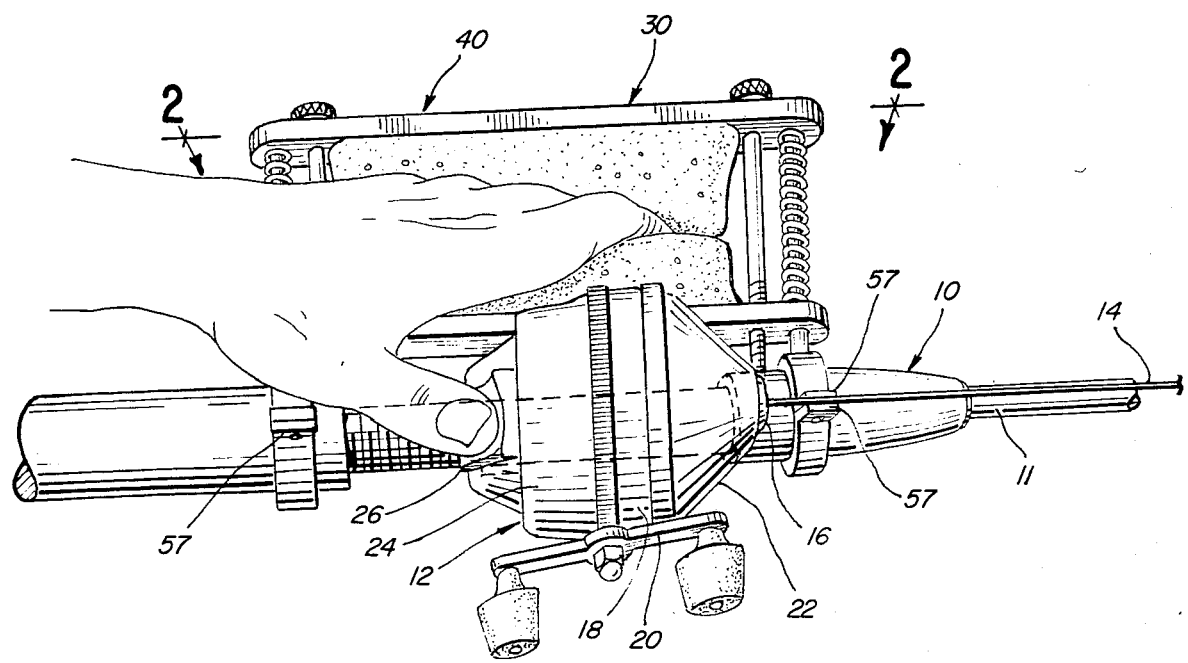
FIG. 1 is a top plan view of a fishing rod and reel with the holding apparatus of the invention secured thereto.

Referring to the drawings, there is shown a handle 10 of a fishing rod 11 (only one end of which is shown), to which is removably attached a fishing reel 12 with a fishing line 14 extending from the line guide 16 at the front of the reel. The fishing line 14 extends along the length of the rod through eyelets or line guides and has attached at the end of the line appropriate hooks, bobbers and sinkers (not shown). The fishing reel 12 is a conventional spin cast reel of the type manufactured and sold by Zebco Division of Brunswick Corporation. The reel illustrated is a style identified as a "33" Reel and has a foot for removable attachment of the reel to the rod 10. The reel 12 has a body portion 18 with a rotatable handle 20 operatively associated with the parts of the reel for winding the line onto a spool (not shown) carried on the body portion of the reel and shielded by a tapered front cover 22. A rear cover 24 is attached to the body portion 18 and has an exposed rearwardly facing thumb button 26 pivotally affixed thereto and extending rearwardly from the rear cover 24. In normal use, by depressing the thumb button 26 the line 14 is braked or held against the inside of the front cover and is prevented from exiting the reel so that the reel and rod can be swung in an arc from in front of the fisherman to behind the fisherman and then as the rod is swung forward, the thumb button is released, whereupon the hook and bait on the end of the line will pull the line from the reel until the hook and bait drops gently into the water. At this point, the crank handle 20 can be rotated to retrieve the line and hook and hopefully a fish caught thereon.

A handicapped person, and in particular a person that has nerve or muscle disorder or damage in the arm and hand, is not able to grip the handle 10 on the rod 11 to hold same during casting, during the wait for a fish to nibble or bite, and during retrieve of the line.

The improvement is directed to a holding apparatus 30 which can be removably attached to the handle 10 of a rod in juxtaposed relationship to the reel which facilitates holding the rod 11 and manipulating the reel 12 by a handicapped person. Specifically, the holding apparatus includes a frame 40 which is composed of a pair of spaced apart side walls 42 and 44 and a pair of spaced apart end rods 46 and 48 extending between the side walls. The side walls 42,44 lie parallel to each and parallel to the handle 10 of the rod. The end rods 46,48 are threaded at 47 and 49, respectively, into opposite end portions of side wall 42. The rods 46,48 pass through apertures 50 in the opposite end portions of the side wall 44 so that the wall 44 can be moved along the axes of the rods 46 and 48 toward and away from the wall 42. A pair of identical compression springs 52 are mounted between the walls 42 and 44 with each spring surrounding one of the rods 46 or 48, with the springs 52 urging the wall 44 away from the wall 42. The rods 46 and 48 are rigidly secured to cylindrical expandable connectors or clamps 54 and 56 and projects radially from said cylindrical connectors or clamps. The cylindrical connectors 54,56 are substantially identical and are composed of a circular band of material 55, such as metal or the like, and have radially directed flanges 57 on each end thereof, with the flanges 57 lying parallel to each other. A screw fastener 59, such as a screw with a wing nut on the head thereof, extends through one of the flanges and is threaded into a threaded aperture in the other of the flanges so that as the screw is tightened, the flanges will be drawn together. To adjust the spacing between the walls 42,44, a pair of adjusting screws 60 and 62 pass freely through apertures 61 in the side wall 42 and have the distal end portions 64,66 threaded into threaded apertures 65 in the side wall 44. An actuating knob 68 is formed on each adjusting screw 60 and 62 and has a knurled peripheral surface facing radially outward therefrom to facilitate turning the adjusting screws to move the wall 44 farther from or closer to the wall 42 as desired.

Attached to the facing surfaces of the side walls 42 and 44 are resilient pads 70,72, respectively, which abut each other along a parting line 74 in the midportion of the space between the walls 42 and 44. The pad 70 is secured to the facing surface 76 of the side wall 42 with pad 72 secured to the facing surface 78 of the side wall 44. The pads 70 and 72 may be formed of any one of a large number of resilient sponge-like material, such as polyurethane foam or the like. The adjusting screws 60 and 62 are manipulated to compression load the pads 70,72 to a degree desired by the fisherman.

In use and operation, a fisherperson who has muscular problems in his left arm and who wishes to hold the rod and reel with his left hand would have the holding apparatus 30 secured to the left side of the rod in juxtaposed relationship to the reel. The adjusting clamps 55 are made to loosely encircle the handle 10 and are moved axially along the handle to locate the holding apparatus relative to the reel in a position that would be comfortable for the fisherperson. The clamps 55 are then tightened to the handle with the plane of the holding apparatus 30 lying perpendicular to the vertical plane of the fishing reel. It should be understood that the plane of the holding apparaus could angle up or down relative to the vertical plane of the reel to accommodate the personal needs of the user. The fingers of the left hand are then threaded through the parting line 74 or slot between the pads 70,72 in the holding apparatus an amount sufficient to permit the fingers of the hand to be bent up around the lower edge of the wall 44 so as to provide a form of grip on the rod. The rod and reel combination is basically held by the resilience of the pad gripping the fingers or hand of the fisherperson. Some handicapped people will have sufficient flexibility to the fingers that the fingers may be curled up around the edge of the wall 44 as mentioned above so that the fingers beneath the holder and the resilience of the pads on the hand provides the necessary control of the rod and reel. With the hand in position in the holding apparatus, the thumb of the hand is comfortably located in alignment with the button 26 so that the button can be depressed and the braking action is affected on the line so that a cast can be made. Some fisherpersons with a more severe handicap will not be able to materially bend the fingers of the hand, in which case, the fingers of the hand are inserted through the slot between the pads whereby the resiliency of the pads on the hand form the holding support for the rod and reel. In the event the holding action of the pads 70,72 on the hand is not sufficient to hold and control the rod, the adjusting screws 60 and 62 are drawn up tighter so that the grip of the pads is sufficient to hold the rod but not sufficient to shut off the circulation in the hand. The fisherperson can still place his thumb on the thumb button 26 to manipulate the operating parts of the reel for casting the bait.

Figure 2:
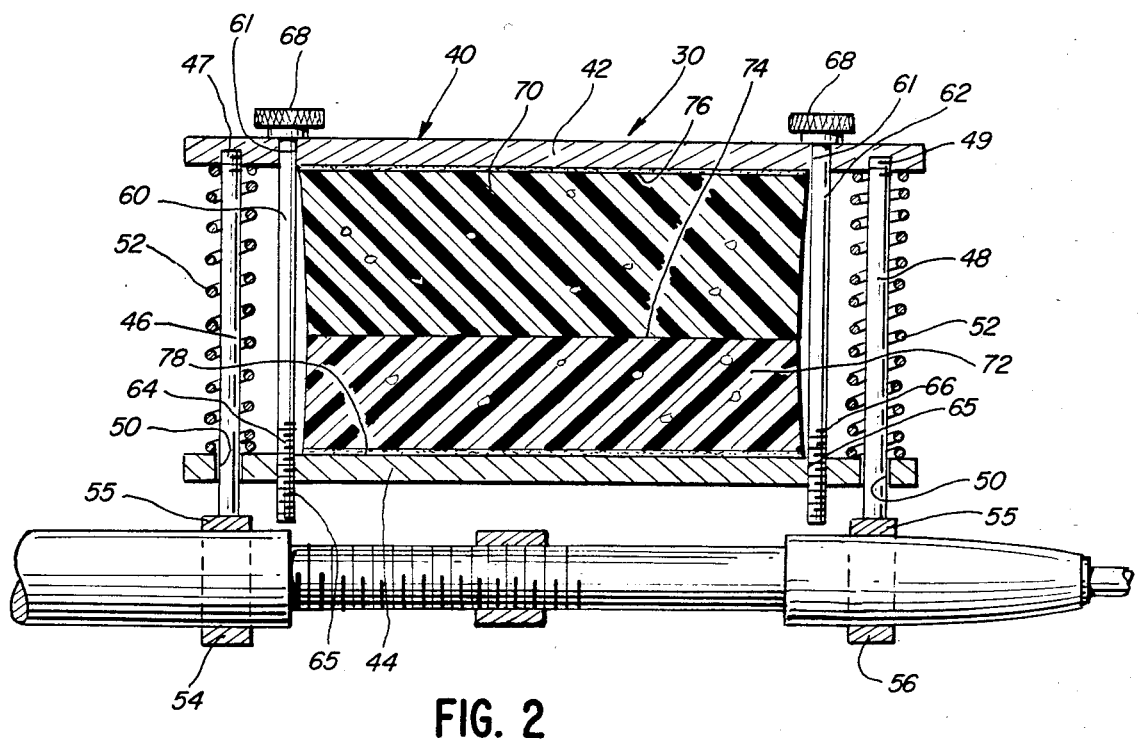
FIG. 2 is a top plan view, partially in section, of a fishing rod and holding apparatus with parts broken away and in section.

As can be seen in FIG. 2, the compression of springs about the rods 46 and 48 force the walls 42 and 44 apart while the adjusting screws 60 and 62 draw the compression springs and the resilient pads 70,72 together to compress the resilient pads against each other at the parting line therebetween.

The holding apparatus is shown attached on the left side of a spin cast reel on the handle of a rod. It is to be understood that the holding apparatus could be attached to the right side of the rod and reel for use by a person seeking to hold the rod and cast the bait using his right hand.

It has been found that inserting a hand of a person that has muscle or nerve disorders in the hand or arm in the slot 74 between the pads 70,72 of the holding apparatus makes it possible for the person to support the rod and reel and to provide enough control of the rod and reel so that the person can cast a bait and retrieve the bait in the process of enjoying the sport of fishing.

I claim:

1. A holding apparatus for attachment to a fishing rod and reel combination, said apparatus comprising a pair of spaced apart side walls and a pair of spaced apart end rods extending transverse to the side walls, one end of each rod being secured to one wall and passing freely through the other wall, clamp means rigidly secured to each rod outboard of said other wall, spring means extending between the side walls for holding said side walls apart, pad means mounted on the facing surfaces of said spaced walls with an exposed edge of one pad abutting an exposed edge of the other pad, and means extending between the side walls for adjusting the distance between the side walls for preloading the spring means and the pads with a predetermined compressive load.

2. A holding apparatus as claimed in claim 1 wherein said pads are comprised of compressible resilient materials.

3. A holding apparatus as claimed in claim 1 wherein said clamp means comprises a cylindrical member split along a line parallel to the axis thereof, spaced flanges formed adjacent said split and threaded means joining said spaced flanges for drawing the flanges together to reduce the size of the cylindrical member.

4. A holding apparatus as claimed in claim 1 wherein the means extending between the side walls is a pair of adjusting screws passing through one wall and being threaded into the other wall so that the walls are drawn together or forced apart upon manipulating the adjusting screws.

5. A holding apparatus, a fishing rod and reel combination having a handle at one end portion of the rod, and means for attaching the holding apparatus to the handle and in juxtaposed relationship to the reel, said means comprising a pair of spaced apart side walls and a pair of spaced apart end rods extending transverse to the side walls, one end of each rod being secured to one side wall and passing freely through the other side wall, clamp means rigidly secured to each rod outboard of said other side wall and removably clamped to the handle of the rod, pad means mounted on the facing surfaces of said spaced side walls with an exposed edge of one pad abutting the exposed edge of the other pad to define a parting line therebetween, and means extending between the side walls for adjusting the distance between the side walls for preloading the pads with a predetermined compressive load whereby a person can hold the rod and reel by inserting a hand between the pads at the parting line so that the resiliency of the pads bearing on the hand will support the rod and reel for casting.

6. A holding apparatus as claimed in claim 5 wherein said pads are comprised of compressible resilient materials.

7. A holding apparatus as claimed in claim 5 wherein said clamp means comprises a cylindrical member split along a line parallel to the axis thereof, spaced flanges formed adjacent said split and threaded means joining said spaced flanges for drawing the flanges together to reduce the size of the cylindrical members as the cylindrical member is drawn up tight on the handle of the rod.

8. A holding apparatus as claimed in claim 5 wherein the means extending between the side walls is a pair of adjusting screws passing through one wall and being threaded into the other wall so that the walls are drawn together or forced apart upon manipulating the adjusting screws.

* * * * *